Oct. 3, 1967     D. VOLK     3,344,692
METHOD AND APPARATUS FOR PRODUCING
ASPHERIC CONTACT LENSES

Filed Oct. 1, 1965     2 Sheets-Sheet 1

INVENTOR
DAVID VOLK
BY
Meyer, Baldwin, Doran & Egan
ATTORNEYS

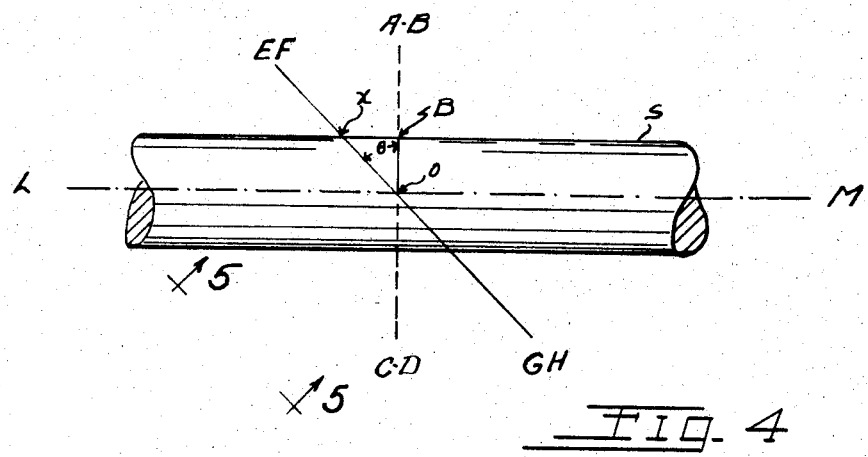
Fig. 4
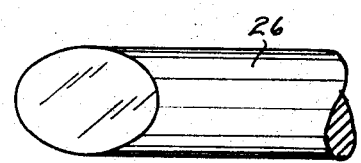
Fig. 5
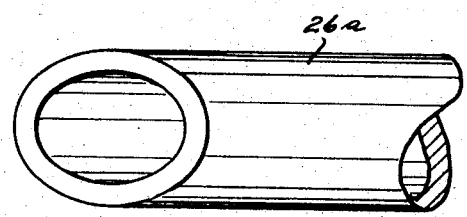
Fig. 6
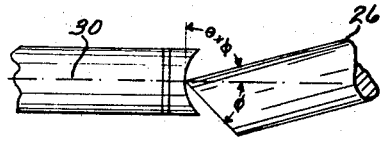
Fig. 7
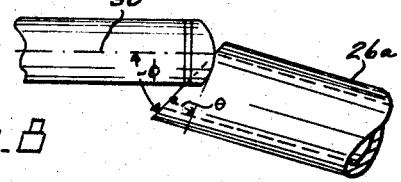
Fig. 8
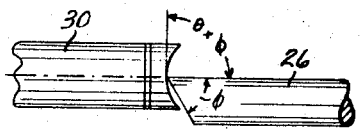
Fig. 9
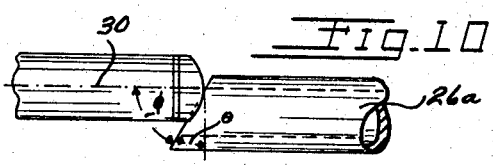
Fig. 10
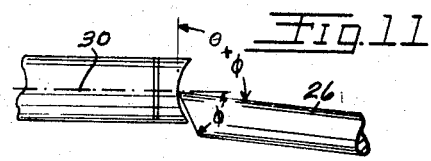
Fig. 11
Fig. 13
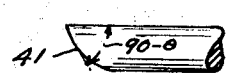
Fig. 14
Fig. 12
INVENTOR
DAVID VOLK
BY
Meyer, Baldwin, Doran & Egan
ATTORNEYS United States Patent Office 3,344,692
Patented Oct. 3, 1967

3,344,692
METHOD AND APPARATUS FOR PRODUCING ASPHERIC CONTACT LENSES
David Volk, 3336 Kersdale Road, Pepper Pike, Ohio 44124
Filed Oct. 1, 1965, Ser. No. 492,217
10 Claims. (Cl. 82—1)

This invention relates to an improved method and apparatus for producing both positive and negative aspherical surfaces of revolution and is primarily intended for, although not limited to, the production of ophthalmic contact lenses.

Corneal contact lenses in which the corneal surface is aspheric are known. In such contact lenses, the negative aspheric surface has been obtained by blending a series of zones of spherical surfaces which gradually decrease in curvature towards the periphery of the lens. With such a method of blending it is very difficult to control the curvature of the negative aspheric surface of the contact lens, and the results from lens to lens are inconsistent. Positive aspheric surfaces on contact lens are not used because of the difficulty in producing them.

The cornea of the eye is not spherical and in general resembles the apical portion of prolate ellipsoids, paraboloids, and hyperboloids. The use of contact lenses with a large central area of spherical curvature on the corneal side can only result in an approximate fit of the lens to the cornea.

With the novel method of this invention, it is possible to produce both positive and negative conicoid surfaces of revolution including ellipsoids, paraboloids and hyperboloids, so that contact lenses with one or both surfaces aspheric, can be made. Such contact lenses can be made to simulate very closely the actual shape of the cornea.

Aspheric contact lenses can be made thinner in an overall manner than conventional contact lenses, and may so closely fit the cornea that better centering of the lens on the cornea can be obtained. With a better fit to the cornea and better centering, aspheric contact lenses can be smaller and lighter in weight than conventional contact lenses. Also, the lighter weight lenses of this invention do not easily slip down on the eye of the wearer.

The object of the present invention is the provision of a method and apparatus for forming the above described aspheric contact lenses. One embodiment of the invention is shown in the accompanying drawings and described in the specification and the essential features thereof will be set forth in the appended claims.

In the drawings,

FIG. 4 is a diagrammatic view showing a preferred manner of constructing the tool used in carrying out this invention by cutting a generally cylindrical piece of material by a plane inclined to the axis of the cylinder;

FIG. 5 is a view taken generally along the line 5—5 of FIG. 4 showing the elliptical form of a tool cutting edge capable of forming negative or concave lens surfaces according to the present invention;

FIG. 6 is a view similar to FIG. 5 showing a negative or hollow tool of tubular form adapted for the same purposes as FIG. 5 when its outer cutting edge is used but also useful for forming positive or convex surfaces lenses as shown in FIGS. 8, 10 and 12;

FIGS. 7 and 8 illustrate the positioning of a tool for cutting ellipsoids of revolution according to this invention;

FIGS. 9 and 10 illustrate the position of the tool for cutting paraboloids of revolution according to this invention;

FIGS. 11 and 12 show the positioning of the tool for forming hyperboloids of revolution according to this invention; while FIGS. 13 and 14 show how the tool working face might be cut along concave and convex lines respectively instead of a plane.

The novel method of this invention comprises in general the mounting of a work blank for rotation about a work axis, providing means for rotating the blank about its axis, providing a generating tool having a sharp cutting edge of hardened steel, when plastic surfaces are to be generated, said edge being elliptical in shape; and, when glass is to be generated, providing a tool of metal with embedded diamond particles, with the sharp abrading edge in the shape of an ellipse, together with means for orienting and positioning said generating tool with respect to the work axis, and providing means for feeding the tool to the revolving work, removing material from the work until the desired surface is obtained.

The term "generated" as used in this invention means formed by the cutting or abrading edge of a tool, said edge being the shape of an ellipse, said ellipse at its major axis intersecting the work axis at the work surface, the work revolving about the work axis, while the tool removes work piece material and shapes the surface in the form of a conicoid of revolution.

Figure 1:
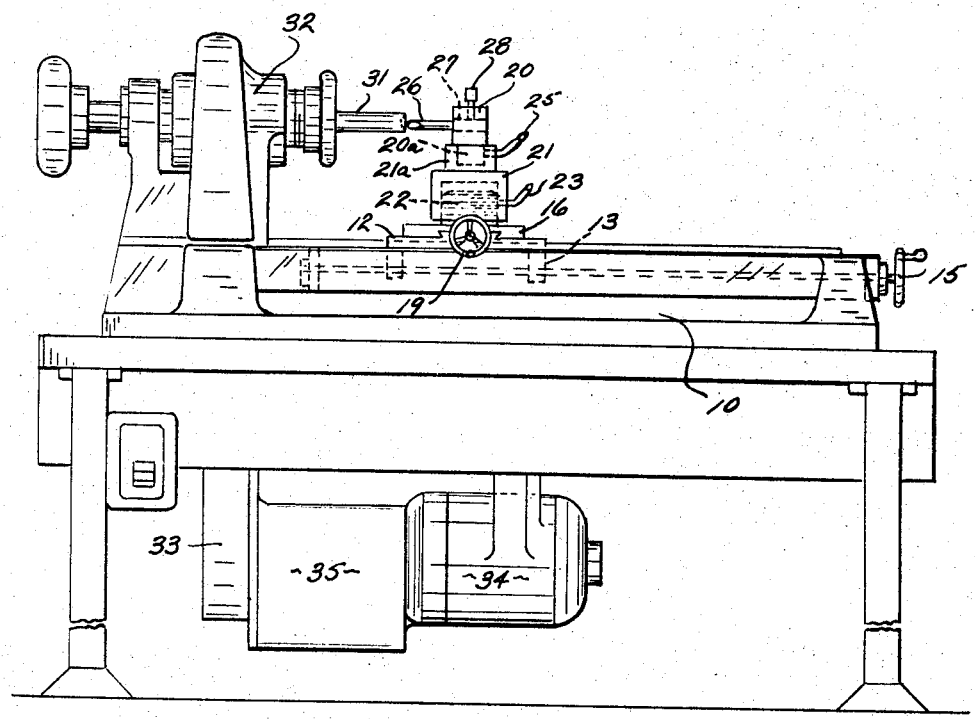
FIG. 1 is a side elevational view of a lathe-type apparatus for carrying out the present invention.
Figure 3:
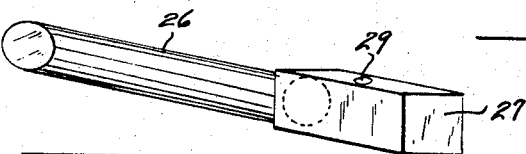
FIG. 3 is a perspective view of a tool adapted to be used in the apparatus shown in FIGS. 1 and 2 for carrying out the present invention.
Figure 2:
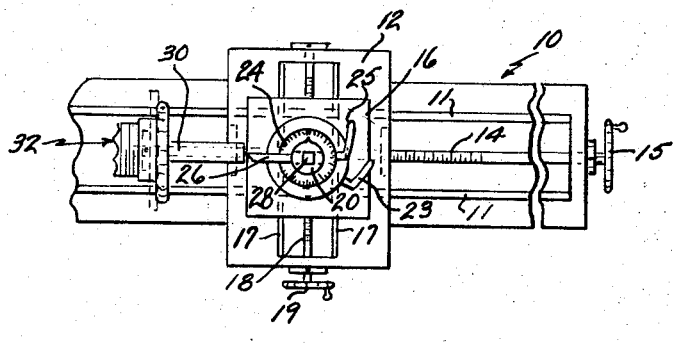
FIG. 2 is a top plan view of a portion of the apparatus in FIG. 1.

The apparatus for carrying out this invention may take several forms. One form as shown in FIGS. 1 and 2 is quite similar in many respects to commonly used lathes in the machine tool industry. This apparatus includes a lathe bed 10 having parallel ways 11 extending longitudinally thereof along which slides a carriage 12 manipulated by means of a screw and nut connection 13 operated by rotating the screw 14 by means on the hand wheel 15, or otherwise as desired. A cross slide 16 is mounted for movement on parallel ways 17 of carriage 12 in a direction at right angles to the first described movement or crosswise of the bed. This again is shown as a screw and nut connection operated by means of rotating the screw 18 using the hand wheel 19. A tool holder 20 has a downwardly extending cylindrical extension 20a rotatably received in a hollow cylindrical sleeve 21a which is part of a tool stand 21 having a threaded engagement 22 with a projection extending upwardly from the cross slide 16. Vertical adjustment of the tool is provided by the threaded connection 22 and locked by means of handle 23. Rotative motion of the tool holder 20 is usually manual and may be read on a calibrated scale 24 and the tool holder locked in position by manipulation of handle 25. The tool 26 of FIG. 3 is passed through a suitable opening 27 in the tool holder 20 and preferably held in position by a threaded bolt 28. This enters a suitable opening 29 in the shank of tool 26.

In carrying out this invention in the manner taught in the present embodiment, a tool constructed according to FIGS. 3, 4 and 5 or according to FIG. 6, is secured in the position shown in the apparatus of FIGS. 1 and 2 and adjustments are made in the three principal directions, two horizontal at right angles to each other, and one vertical, to position the apex of the elliptical tool cutting edge as nearly as possible on the exact center line 30 of the axis about which the work is caused to rotate. The work piece 31 is held in any desired chuck or collet in a head stock 32 and is rotated by a driving connection not shown passing through housing 33 and driven by a motor 34 through a speed reduction 35. This is a standard mechanism and need not be further described here.

The tool, with its edge in the form of an ellipse, can be obtained by sectioning a right circular cylinder or a right circular cone. The simpler and preferred form of tool consists in sectioning a right circular cylinder by a plane at an angle with respect to a right cross section. Such a tool is more useful because of the ease of truing and sharpening. FIG. 4 is a view of a right circular cylinder S with a cross section radius OB of length B. Plane ABCD is perpendicular to the axis LOM of S, and plane EFGH, which is oblique to plane ABCD by angle $\theta$, sections the cylinder in an ellipse of eccentricity $e$, where $e = \sin \theta$. The radius of curvature $r$ of the ellipse at the end of its major axis is $B \cos \theta$.

$$r = B \cos \theta \tag{1}$$

where B is the semi-minor axis of the ellipse, and $$OX = \frac{B}{\cos \theta}$$

is the semi-major axis of the ellipse.

For generation of negative conicoids of revolution, the outer convex ellipse formed by a plane sectioning either a solid or a hollow tubular right circular cylinder is the shape of the cutting or abrading edge of the tool. See FIGS. 5, 6 and 7. For the generation of positive conicoids of revolution, the inner concave ellipse formed by sectioning a hollow right circular cylinder is the shape of the cutting or abrading edge of the tool.

In the geometry of surfaces, it is well known that sections of conicoids of revolution are conics. For example, sections of hyperboloids of revolution of two sheets can be hyperbolas, parabolas, ellipses and circles. Sections of paraboloids of revolution can be parabolas, ellipses and circles, and sections of ellipsoids of revolution can be ellipses and circles.

This knowledge is the basis for the generation of conicoids of revolution by the method of this invention with a tool having an edge of elliptical outline.

In the generation of a conicoid of revolution by the method of this invention, the elliptical generating tool at the end of its major axis contacts the work at the work axis in an elliptical arc, such that the plane of the elliptical arc is at an angle to the work axis, see FIGS. 7 through 12.

Two equations relate the eccentricities and apical radii of curvature of the generated conicoids of revolution with the eccentricities and apical radii of curvature of the elliptical generating tool:

$$e_{\text{gen}} = \frac{e_{\text{tool}}}{\cos \phi} \tag{2}$$

$$r_{\text{gen}} = \frac{r_{\text{tool}}}{\cos \phi} \tag{4}$$

where $e_{\text{gen}}$ is the eccentricity of the generated surface, and $e_{\text{tool}}$ is the eccentricity of the elliptical tool, and where $r_{\text{gen}}$ is the apical radius of curvature of the generated surface, and $r_{\text{tool}}$ is the radius of curvature of the elliptical tool at the major axis, and where $\phi$, the inclination, is the acute angle between the work axis and the plane of the generating tool ellipse. Angle $\theta$ is arbitrary, but for best results, it is preferably some value between 30° and 60°.

Based upon Equations 1, 2 and 3, the relationship between $r_{\text{gen}}$, $e_{\text{gen}}$, $\theta$, and B, the radius of the tool cylinder, is given by the following equation:

$$\frac{r_{\text{gen}} \tan \theta}{e_{\text{gen}}} = B$$

where the minimal value for $e_{\text{gen}}$ is $\sin \theta$, in which case $r_{\text{gen}} = B \cos \theta = r_{\text{tool}}$.

Using Equation 4 and a value of 35° for $\theta$, I have calculated, as an example, B values corresponding to a limited series of values of $r_{\text{gen}}$ for values of $e_{\text{gen}}$ .700, 1.000, and 1.200. These values are listed in the following table, it being understood that $e$ values of 0.700, 1.000, and 1.200 are for ellipsoids, paraboloids and hyperboloids respectively.

B VALUES

| $r$, mm. | $e=.700$, mm. | $e=1.000$, mm. | $e=1.200$, mm. |
| --- | --- | --- | --- |
| 7.00 | 7.002 | 4.901 | 4.085 |
| 7.10 | 7.102 | 4.971 | 4.143 |
| 7.20 | 7.202 | 5.041 | 4.201 |
| 7.30 | 7.302 | 5.112 | 4.260 |
| 7.40 | 7.402 | 5.182 | 4.318 |
| 7.50 | 7.502 | 5.252 | 4.376 |
| 7.60 | 7.602 | 5.322 | 4.435 |
| 7.70 | 7.702 | 5.392 | 4.493 |
| 7.80 | 7.802 | 5.462 | 4.551 |
| 7.90 | 7.902 | 5.532 | 4.610 |
| 8.00 | 8.002 | 5.602 | 4.668 |

As a specific example of a negative ellipsoid generated by the method of this invention, consider the following predetermined variables: B (radius of curvature of the right circular cylinder from which the tool is formed) =6.351 mm., $\theta$ (acute angle between the plane of the generating tool ellipse and a right cross section of the right circular cylinder of the tool)=30°. With the above two variables, the tool ellipse has an eccentricity of .50 and an apical radius of curvature $r$ of 5.50 mm., $\phi$, the inclination (the angle between the work axis and the plane of the ellipse of the generating tool)=44.417°. As the elliptical generating tool is fed by hand wheel 15 into the rapidly revolving work 31, work material is removed by the elliptical cutting or abrading edge of the tool until the entire surface is generated, the surface being an ellipsoid of revolution of eccentricity .7 and apical radius of curvature of 7.7 mm. See FIG. 7.

By using a negative or hollow tool and with the same adjustments of the variables, a positive ellipsoid of revolution can be generated, of eccentricity .70 and apical radius of curvature of 7.70 mm. See FIG. 8.

Consider as a second example, the negative surface generated by the method and apparatus of this invention with the following predetermined variables:

B=4.446 mm.
$\theta = 30°$
$\phi = 60°$ with the above predetermined variables, the tool ellipse has an eccentricity of .50 and an apical radius of curvature of 3.85 mm. With the inclination $\phi$ set at 60°, the surface generated will be a paraboloid of revolution ($e=1$), having an apical radius of curvature of 7.70 mm. See FIG. 9. By using a negative or hollow tool and with the same adjustments of the variables, a positive paraboloid of revolution can be generated of eccentricity 1.00 and having an apical radius of curvature of 7.70 mm. See FIG. 10.

Consider as a third example the negative surface generated by the method and apparatus of this invention with the following predetermined variables:

B=3.705
$\theta = 30.000°$
$\phi = 65.376°$

With the above predetermined variables, the tool ellipse has an eccentricity of .50 and an apical radius of curvature of 3.208 mm. With the inclination $\phi$ set at 65.376°, the surface generated will be a hyperboloid of revolution of $e=1.20$, having an apical radius of curvature of 7.70 mm. See FIG. 11.

By using a negative or hollow tool and with the same adjustment of the variables, a positive hyperboloid of revolution of eccentricity 1.20, having an apical radius of curvature of 7.70 mm. See FIG. 12.

The above examples are sufficient to demonstrate that with the appropriate predetermined variables, a wide range of positive and negative conicoids of revolution can be generated by the method and apparatus of this invention.

Hereinbefore I have described this invention as carried out by cutting a generally cylindrical tool along a plane surface to provide a true ellipse. Similar and somewhat modified lens surfaces may be successfully produced where the cylindrical tool is cut along a concave surface 40 and indicated in FIG. 13, or along a convex surface as indicated at 41 in FIG. 14. In each case, the angle $90 - \theta$ is shown as being the angle measured between the tangent to the curve at the apex and an element of the tool cylinder parallel to its axis. The angle $\theta$ thus determined may be used as hereinbefore described in carrying out this invention.

In the case of FIG. 13, as the tool cuts into the material being formed there is an increasing eccentricity as one departs from the apex along the cut being formed. In the case of FIG. 14, there is a decreasing eccentricity as one departs from the apex of the tool during the cutting operation.

Where in the claims I define a tool of cylindrical form having a generally elliptical generating face, I intend to include the modified elliptical faces formed as shown in FIGS. 13 and 14.

Where I have defined the formation of the tool cutting face as provided by cutting through a cylindrical tool, at an angle, I intend to include the right circular cylinder and the ellipitical cylinder, and I also intend to include a similar cutting face formed by cutting through a conical tool blank at an angle to the right axis of the cone. However, the elliptical cylinder form of tool blank and the cone form of tool blank are much more difficult to provide accurately and I prefer the right circular cylinder form of tool blank.

Although the invention as described to this point in the specification is described for the direct generation of lenses, this invention is also directed to and includes the generation of other optically useful surfaces, including molds for molding or casting lenses of plastic, laps for grinding and polishing lenses generated by the method and apparatus of this invention, and cams for the production of conicoids of revolution by generators utilizing cams and cam followers. The tool material and lubricant used will depend on whether one is forming plastic, glass, metal or a molding material. In forming the plastic methyl methacrylate, I have successfully used a steel tool with water lubricant.

What is claimed is:

1. Apparatus for generating aspherical surfaces on a workpiece of optical material comprising means for rotating said workpiece about a work axis, a material removing tool of cylindrical form having an elliptical generating face formed by a plane cutting said cylindrical form at an angle $\theta$ relative to a right section of said cylindrical form, means for positioning said tool with the end of an axis of said elliptical face substantially on said work axis and with said face forming an angle $\phi$ relative to said work axis, and means for moving said tool in said position into said workpiece along a path parallel to said work axis while said workpiece is rotating.

2. Apparatus as defined in claim 1 wherein said elliptical generating face is defined by the outer perimeter of said tool cylindrical form and is useful for generating negative surfaces of revolution.

3. Apparatus as defined in claim 1 wherein said tool is hollow having an internal wall of cylindrical form defining an interior edge of said face and is useful for generating positive surfaces of revolution.

4. Apparatus as defined in claim 1 wherein $\theta$ plus $\phi$ is less than 90° for generating ellipsoids of revolution.

5. Apparatus as defined in claim 1 wherein $\theta$ plus $\phi$ is equal to 90° for generating paraboloids of revolution.

6. Apparatus as defined in claim 1 wherein $\theta$ plus $\phi$ is greater than 90° for generating hyperboloids of revolution.

7. The method of generating as aspherical surface on a workpiece of optical material comprising rotating a workpiece about a work axis and causing relative approach movement between the workpiece and a tool having a generally elliptical cutting face while holding the plane of the cutting face at an angle to the axis of the workpiece with the apex of the elliptical face coincident with the work axis.

8. The method of claim 7 wherein the axis of the tool may be parallel to or at an angle to said work axis.

9. The method of claim 8 wherein the parallel relationship of said tool axis and work axis is effective to produce paraboloids of revolution.

10. The method of claim 8 wherein the angular relation between said tool axis and work axis is effective on one side of said parallel position to produce ellipsoids of revolution, and on the opposite side of said parallel position to produce hyperboloids of revolution.

References Cited
UNITED STATES PATENTS 2,237,744   4/1941   Mullen _____ 82—1

WILLIAM W. DYER, JR., *Primary Examiner.*

LEONIDAS VLACHOS, ANDREW R. JUHASZ,
*Examiners.*

UNITED STATES PATENT OFFICE
CERTIFICATE OF CORRECTION

Patent No. 3,344,692                                        October 3, 1967

David Volk

It is hereby certified that error appears in the above numbered patent requiring correction and that the said Letters Patent should read as corrected below.

Column 3, line 55, for "(4)" read -- (3) --; line 70, to the right of the formula insert -- (4) --; column 6, line 26, for "as" read -- an --.

Signed and sealed this 12th day of November 1968.

(SEAL)
Attest:

Edward M. Fletcher, Jr.                                    EDWARD J. BRENNER
Attesting Officer                                               Commissioner of Patents